United States Patent [19]
Beitel

[11] Patent Number: 6,025,801
[45] Date of Patent: Feb. 15, 2000

[54] VIDEO GAME WITH LOCAL UPDATES MITIGATES LATENCY EFFECTS IN WIDE AREA NETWORK

[75] Inventor: Bradley James Beitel, San Carlos, Calif.

[73] Assignee: Philips Electronics North America Corporation, New York, N.Y.

[21] Appl. No.: 08/722,414

[22] Filed: Oct. 1, 1996

[51] Int. Cl.[7] .................................................. G01S 3/02
[52] U.S. Cl. ............................................ 342/457; 463/42
[58] Field of Search .................................. 463/42, 41, 40, 463/39; 342/457; 370/320, 335; 379/59; 455/54.1

[56] References Cited

U.S. PATENT DOCUMENTS 4,901,307  2/1990  Gilhousen et al. .
5,612,703  3/1997  Mallinckrodt .

FOREIGN PATENT DOCUMENTS

0696018A2  2/1996  European Pat. Off. ........ G06T 15/00
0736832A2  10/1996  European Pat. Off. ........ G06F 17/00

Primary Examiner—George Manuel
Attorney, Agent, or Firm—Peter Verdonk

[57] ABSTRACT

Multiple users share a virtual environment through an interactive software application. State changes of a specific user are transmitted to one or more other users dependent on respective relative distances in the virtual environment between the specific user and each respective one of the other users. This conditional transmission reduces message traffic and allows a virtual environment to scale indefinitely.

8 Claims, 1 Drawing Sheet

VIDEO GAME WITH LOCAL UPDATES MITIGATES LATENCY EFFECTS IN WIDE AREA NETWORK

FIELD OF THE INVENTION

The invention relates to a method and a system for processing a multi-user software application. The invention relates in particular, but not exclusively, to multi-user video games played via a wide-area-network.

BACKGROUND ART

The technology required to build a multiplayer video game supporting a few players on a high-speed local-area-network (LAN) is far different from doing the same thing with many players on a wide area network (WAN) with relatively low speed terminal connections and unknown latency. Adding more realism to the experience requires even more technology advances.

Multi-player games can create considerable bandwidth requirements. Even with all the content stored locally, e.g., in all client machines, state changes in the shared environment come quick and require lots of message traffic. LAN based games typically use "broadcast mode" to send messages to all stations on the network. In wide area networks, when one client station changes the environment, a message must be sent to each of the other players. The number of messages that network must handle goes up by the square of the number of the players. In fast changing environments such as video games, changes in state can come as often as ten times per second.

OBJECT OF THE INVENTION

A known solution to the bandwidth problem is the use of multicasting, either through the network operating system or a server. For example, all state changes are first sent to the server, which then distributes them to each client. This greatly reduces the upstream messages, but does little to reduce down stream traffic. Accordingly, it is an object of the invention to provide a solution to the problem of down stream traffic in a multi-user software application.

SUMMARY OF THE INVENTION

The inventor proposes to let the server keep track of where each player is in the virtual environment, and to have messages sent to those players close by to the location, in the virtual environment, of the origin of the state change. This scheme is intuitively readily acceptable. Changes in the real world propagate at a finite rate and/or have restricted range. The invention provides a method of processing a software application that enables interaction among multiple users sharing virtual environment. For each specific one of the users a change as to a state, associated with the specific user, is transmitted to one or more other users dependent on respective relative distances in the virtual environment between the specific user and each respective one of the other users. Such a technique could allow a virtual environment to scale indefinitely, at the expense of complexity in state caching. In this case, only the server has the complete and true state of the virtual environment.

BRIEF DESCRIPTION OF THE DRAWINGS

The invention is explained in further detail and by way of example with reference to the accompanying drawings, wherein.

Throughout the figures, same reference numerals indicate similar or corresponding features.

DETAILED EMBODIMENTS

Figure 1:
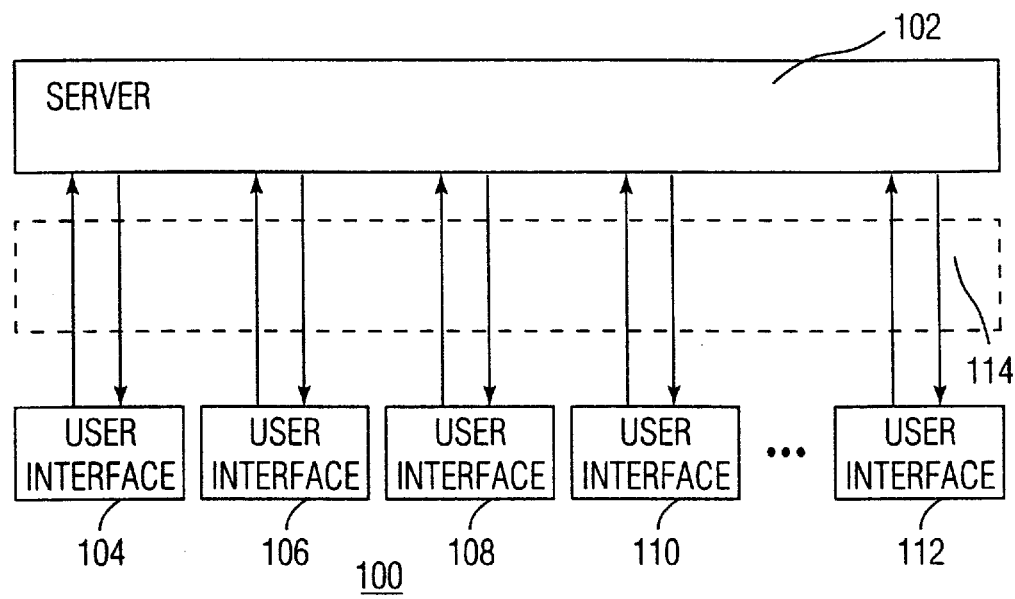
FIG. 1 is a diagram of client-server system.

FIG. 1 is a diagram of a client-server system 100. System 100 comprises a server 102 and a number of, say N, user-interface apparatus 104, 106, 108, 110, . . . , 112. Server 102 and apparatus 104–112 are interconnected via an interconnection network 114. System 100 processes a software application, through which N users interact in a shared virtual environment. Suppose that each of the N−1 users is to be notified each time a particular one of the N users causes a state change of the application. This implies for N users that traffic via network 114 may be as dense as N(N−1) messages per unit of time, and that per user the number of outgoing and incoming messages may peak at 2(N−1). For a casting of N=10 users, the maximum number of messages over network 114 is 90, and the maximum number of messages per user is 18. For N=100, these numbers are 9900 and 198, respectively. In a typical multiple user video game, state changes may come as often as ten times per second. Traffic this dense make high demands on network 114. Regardless of the technology used, each implementation of network 114 has its limits as to the maximum number of messages it can handle.

Figure 2:
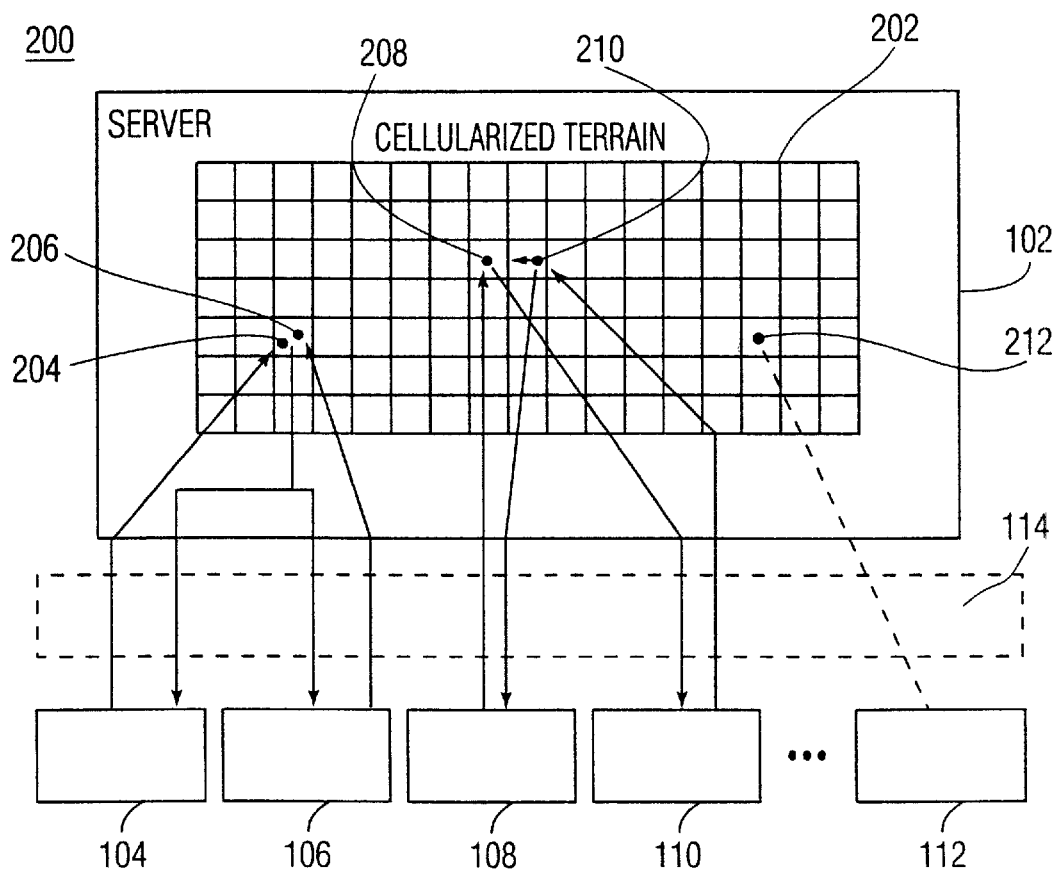
FIG. 2 is a diagram showing the location of updates in a cellularized virtual environment.

FIG.2 is a diagram of a client-server system 200 according to the invention. System 200 comprises a server 102 and user-interface apparatus 104–112 interconnected via an interconnection network 114. The software application lets users interact via a shared virtual environment 202. State changes of each of the users are sent from apparatus 104–112 to server 202, which then distributes the state changes to each of the other users. This reduces up stream message traffic, i.e., the number of messages sent by each individual one of apparatus 104–112.

The invention reduces down stream traffic, i.e., the number of messages sent from server 102 to user-interface apparatus 104–112. This reduction is achieved as follows. For each specific one of the users 104–112, a state change of the application, associated with the specific user, is conditionally sent to one or more other users. The condition is that respective relative distances in the virtual world between the specific user and each respective one of the other users is not larger than a specific threshold.

For example, virtual environment 202 is composed of adjacent geographic cells, here represented by the square boxes, and the relative distance between the users is measured in terms of numbers of cells lying in between. Locations of users 104–112 in virtual environment 202 are represented by dots 204, 206, 208, 210 and 212, respectively. In this representation, users 204 and 206 reside in the same cell, users 208 and 210 are located in neighboring cells, and user 212 is out there all alone. The cells may represent geographical areas, rooms, buildings, computers, etc., in virtual environment 202 and enable introduction of the concept "distance".

State changes of users 204 and 206 are notified to each other. User 212 may do as he like in the outback. His state changes will become relevant to another user when the latter comes within range of user 212.

User 210 is notified of the state change of user 208 in the cell that user 210 is about to enter. This enables user 210 to know the state of his new cell so that he will not have to pause for updates when he arrives. Preferably, a user knows the states of his current cell and of the surrounding cells. The updates may be cached in the background memory (not shown). This permits a user to move freely from his current cell into any of the surrounding cells without hesitation. Similarly, user 208 is notified of the state changes in the cell currently occupied by user 210. The cell size should be big enough, or the speed of user 210 in virtual environment 202 should be low enough, so that these updates have time to reach both users 210 and 208, before user 210 leaves his current cell.

The threshold need be uniform neither for all users, nor for all locations. The software application, or the server itself, may specify dynamically varying thresholds depending on the location in the virtual environment. For example, assume that the virtual environment represents part of a coast and part of an ocean. The threshold for activities on the high seas may be set higher than land-based activities to compensate for large distances at sea. Also, the threshold needs not be dependent on distance only. Number of users or participants, rate of state change and direction of the state change, e.g., movement of the user in virtual environment relative to the other user(s), are other quantities that can be taken into account to determine the efficient routing of messages.

The invention thus may be embodied in a method of processing, a data processing system of the client-server type, and even in a multi-user software program stored in a memory and operative to enable interaction between users in a virtual environment and to enable interaction between a pair of users dependent on a relative distance between associated locations of the pair of users in the virtual environment.

I claim:

1. A method of processing a software application enabling interaction among multiple users sharing a virtual environment via an interconnecting network, the method comprising:

for each specific one of the users transmitting a change of a state of the application, associated with the specific user, to one or more other users dependent on respective relative distances in the virtual environment between the specific user and each respective one of the other users.

2. The method of claim 1, wherein the virtual environment is composed of geographic cells, and wherein the method comprises measuring the respective relative distances in terms of numbers of cells between the specific user and each respective one of the other users.

3. The method of claim 2, comprising transmitting the state change of the each specific user to the other user only when the other user and the specific user are in the same cell or in neighboring cells.

4. The method of claim 1, wherein the transmitting of the change of the state also depends on at least one of the following quantities: number of users, a rate of state change; and a direction of the state change relative to the other user or other users.

5. A data processing system comprising:

a server for processing a software application enabling interaction among multiple users sharing a virtual environment;

a plurality of user-interface apparatus; and a network interconnecting the apparatus to the server; wherein:

each user-interface apparatus is operative to sends a respective state change to the server under control of the respective user; and the server is operative to distribute the respective state changes to other ones of the user-interface apparatus dependent on a respective relative distances in the virtual environment between the respective user and each of the other users.

6. The system of claim 5, wherein:

the server is operative to keep track of a location of each respective one of the users in the virtual environment; and the server is operative to determine the respective relative distances.

7. The system of claim 6, wherein:

the server is operative to represent the virtual environment as a collection of geographic cells; and the server is operative to determine the relative distances in terms of numbers of cells between the locations of the users.

8. A multi-user program stored in a memory and operative to enable interaction between users in a virtual environment and to enable interaction between a pair of users dependent on a relative distance between associated locations of the pair of users in the virtual environment.

* * * * *